Sept. 7, 1965 H. V. KIRK 3,204,553
ADDRESS STRIP FEED MEANS FOR ADDRESSING MACHINE
Filed March 11, 1964 9 Sheets-Sheet 1

*INVENTOR.*
HARRY V. KIRK
BY
ATTORNEY

Sept. 7, 1965    H. V. KIRK    3,204,553
ADDRESS STRIP FEED MEANS FOR ADDRESSING MACHINE
Filed March 11, 1964    9 Sheets-Sheet 2

FIG.4

INVENTOR.
HARRY V. KIRK
BY
Richard P. Lindberg
ATTORNEY

Sept. 7, 1965 H. V. KIRK 3,204,553
ADDRESS STRIP FEED MEANS FOR ADDRESSING MACHINE
Filed March 11, 1964 9 Sheets-Sheet 4

FIG.7

INVENTOR.
HARRY V. KIRK
BY
ATTORNEY

Sept. 7, 1965 H. V. KIRK 3,204,553
ADDRESS STRIP FEED MEANS FOR ADDRESSING MACHINE
Filed March 11, 1964 9 Sheets-Sheet 6

INVENTOR.
HARRY V. KIRK
BY
ATTORNEY

Sept. 7, 1965  H. V. KIRK  3,204,553
ADDRESS STRIP FEED MEANS FOR ADDRESSING MACHINE
Filed March 11, 1964  9 Sheets-Sheet 7

*INVENTOR.*
HARRY V. KIRK
BY
ATTORNEY

Sept. 7, 1965            H. V. KIRK            3,204,553

ADDRESS STRIP FEED MEANS FOR ADDRESSING MACHINE

Filed March 11, 1964            9 Sheets-Sheet 8

INVENTOR.
HARRY V. KIRK

United States Patent Office 3,204,553
Patented Sept. 7, 1965

3,204,553
ADDRESS STRIP FEED MEANS FOR
ADDRESSING MACHINE
Harry V. Kirk, Libertyville, Ill., assignor to Cheshire Incorporated, a corporation of Illinois
Filed Mar. 11, 1964, Ser. No. 352,423
18 Claims. (Cl. 101—53)

This invention relates to machines for addressing flat articles such as magazines, newspapers or the like, and has particular reference to a machine for impressing an address on to a flat article from an address strip having reversed images thereon.

This application is a continuation-in-part of my application Serial No. 140,349, filed September 25, 1961, now abandoned.

Heretofore, it has been the practice to address magazines and newspapers by a machine which employed a strip having subscribers' addresses arranged thereon. Such machines have been of the type exemplified in Ridenour Patent No. 2,606,681, issued October 12, 1952, for Machine for Applying Address Labels, which shows a machine which feeds the address strip, severs same into a discrete address label, applies adhesive thereto, and then applies the severed and pasted label to a moving book.

Such address strips are prepared from master lists, and it has been necessary to prepare a new strip for each run. The invention herein comprehends a machine making use of an address strip from which a number of impressions can be taken until the master list is revised and a new address strip prepared therefrom. The machine according to the present invention accordingly makes use of an address strip where the addresses are arranged in reverse or mirror images and formed of inks from which a number of impressions may be taken, the strip being stored after such impression and subsequently reused as desired.

With the foregoing considerations in mind, it is a principal object of this invention to provide an improved addressing machine useable with an address strip which applies an address to a flat article such as a moving magazine or other periodical by the application of pressure to a discrete address on the strip.

Another object is to provide an addressing machine which will feed an address strip having transferable reversed images thereon in timed relationship to a moving mailing piece, so that a discrete reversed image address on the strip moves into contact with the mailing piece for the transfer of an obverse image to the mailing piece.

Still another object is to provide a machine for feeding an address strip having transferable images thereon, said machine being characterized by structure for intermittently feeding the strip with respect to a pressure applying roller.

Yet another object is to provide a machine characterized by the absence of intermittent moving mechanism, but which will intermittently feed an address strip for the transfer of an image thereon to a moving mailing piece.

A yet further object is to provide an addressing head adapted to place an address on a moving book by the application of pressure to a discrete address of an addess strip, said head being characterized by structure for continuously feeding the address strip from a supply thereof, yet intermittently moving the discrete address of the strip into position for taking an impression therefrom.

Other objects and important features of the invention will be apparent from a study of the following specification taken with the drawings, which together describe and illustrate a preferred embodiment of the invention, and what is now considered to be the best mode of practicing the principles thereof. Other embodiments may be suggested to those having the benefit of the teachings herein and such other embodiments are intended to be reserved especially as they fall within the scope and spirit of the subjoined claims.

*General description of machine*

Figure 1:
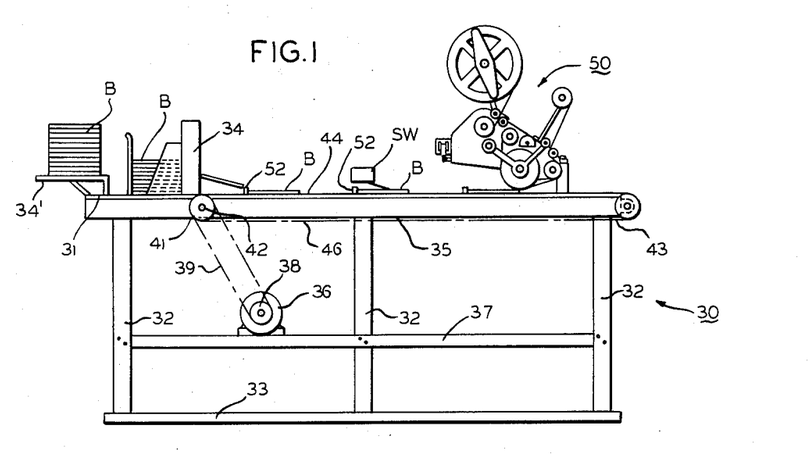
FIG. 1 is an elevational view showing an addressing machine embodying the improvements according to the present invention.

Referring now particularly to FIG. 1 of the drawings, the improvements according to the present invention are embodied in an addressing machine referred to generally by the reference numeral 30 and comprising a table 31 having laterally spaced under side rails 35 supported upon legs 32 spanned at their lower ends by runner members 33, the latter being supported upon any convenient surface. The table 31 supports a feed hopper 34 and a shelf 34' for a supply of flat articles such as mailing pieces B. Throughout this specification such mailing pieces will be referred to as books and such term is intended to cover flat articles capable of receiving intelligence such as magazines, periodicals or circulars. The details of the feeder 34 form no part of the present invention and may be of the type disclosed in the aforesaid Ridenour patent. Irrespective of the form of such feeder apparatus it is adapted to be driven by a motor 36 resting upon a support shelf 37 in turn supported upon the legs 32. The motor 36 has a sprocket 38 which drives an endless sprocket chain 39 trained about a driving sprocket 41 fast on a shaft 42, see also FIGS. 18 and 19. The shaft 42 provides a driving means for the feeder 34 and a chain flight conveyor 43 having an upper conveying reach 44 and a lower return reach 46.

Figure 18:
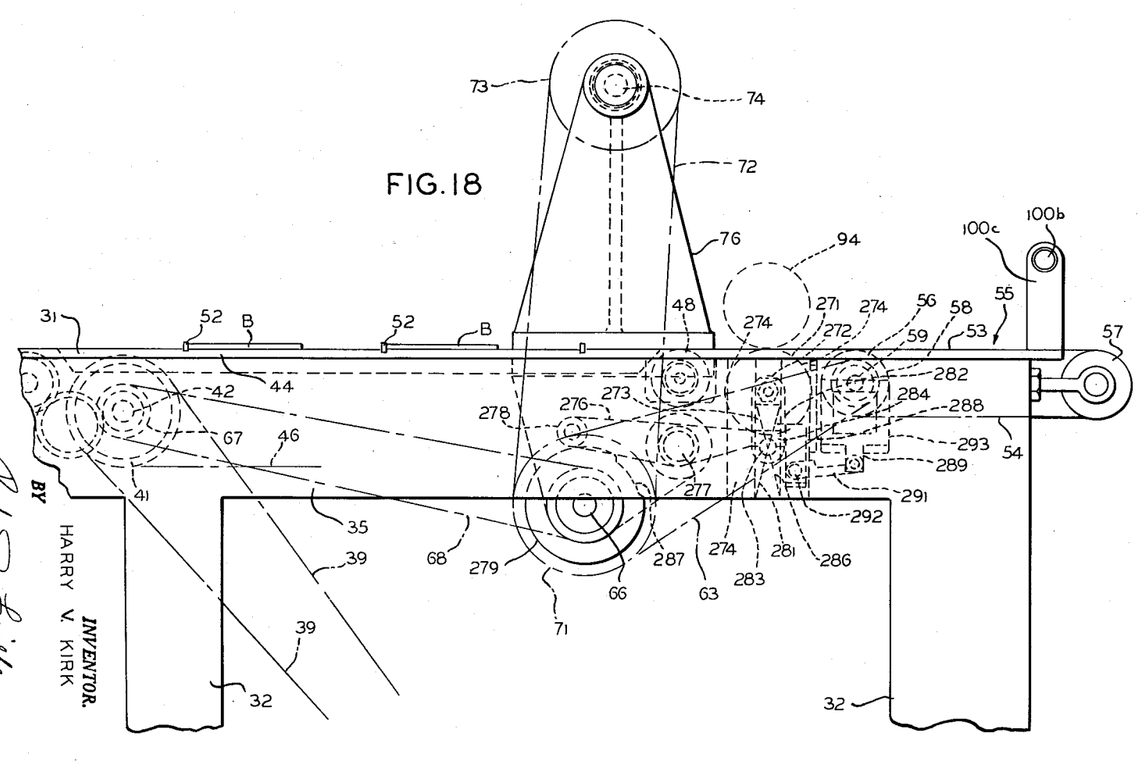
FIG. 18 is a front elevational view showing details of driving mechanism for the address machine according to the present invention.
Figure 19:
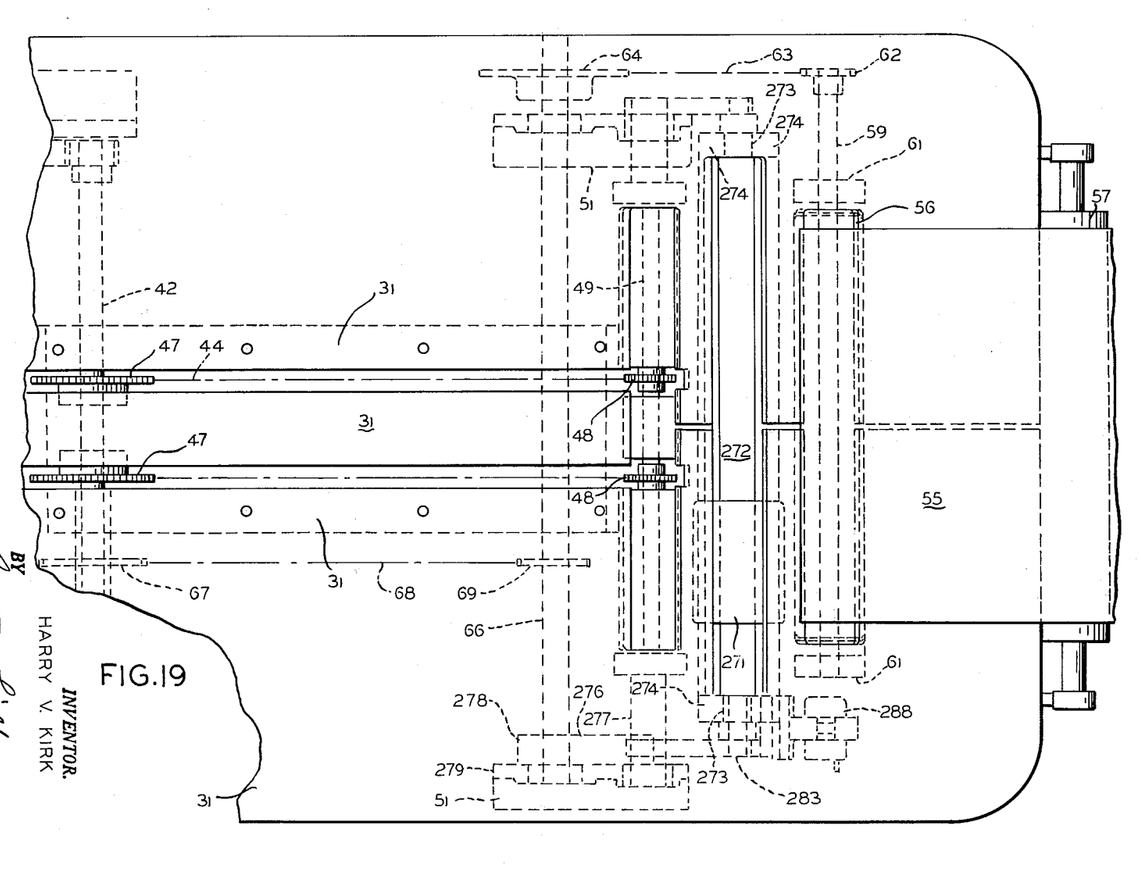
FIG. 19 is a plan view thereof.

As seen in FIGS. 18 and 19, the chain conveyor 43 is driven by laterally spaced sprockets 47 fast on the drive shaft 42, the chain conveyor 43 being reversed in direction about idler sprockets 48 supported on a shaft 49, in turn supported at its ends in pillow blocks 51 supported in the laterally spaced underside rails 35, see again FIG. 1.

The conveyor chains 43 have lugs 52 carried thereon at regularly spaced intervals, the lugs 52 being adapted to engage the back edge of the book B as it moves along the table 31, see also FIG. 18.

As the books B move along the table 31, each is adapted to have an address placed thereon by an addressing head referred to generally by the reference numeral 50, and after receiving the address the books B move on to a belt delivery conveyor 55 consisting of a conveying reach 53 in the plane of the table 31 and a return reach 54, the belt conveyor being reeved between pulleys 56 and 57. Belt conveyor 55 is driven by pulley 56, see FIGS. 18 and 19, pulley 56 being fast upon a shaft 59 supported in pillow blocks 61 secured to the underside of the table 31. Shaft 59 has a sprocket 62 fast thereon driven by a sprocket chain 63 trained between a sprocket 64 fast on a shaft 66 and the sprocket 62. Shaft 66 receives its driving effort from a sprocket 67 fast on to the main drive shaft 42, there being a sprocket chain 68 trained between the sprocket 67 and a sprocket 69 fast on the shaft 66.

The drive shaft 66 extends laterally beyond the table 31, and has a sprocket 71 fast thereon (not shown in FIG. 19) which cooperates with a sprocket chain 72 trained about a sprocket 73 fast on a shaft 74. A pair of lateral standards 76 are supported on the table 31 and a drive shaft for the mailing head extends therebetween.

*General description of address applying head*

Referring now particularly to FIGS. 4 to 8 of the drawings, the address applying head 50 includes a main back frame 78 and a main front frame 79 having a flange 81 meeting the back frame 78. The two frames 78 and 79 provide supports for structure for moving an address strip S, seen in FIG. 2, and to heat a discrete address A on the strip S and to place pressure against the same all in timed relationship to the book B.

Figure 2:
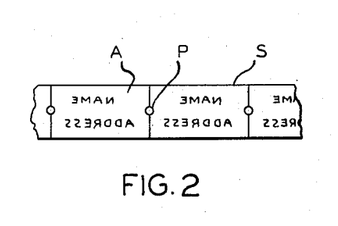
FIG. 2 shows a form of address strip adapted to be used by the machine of FIG. 1.
Figure 4:
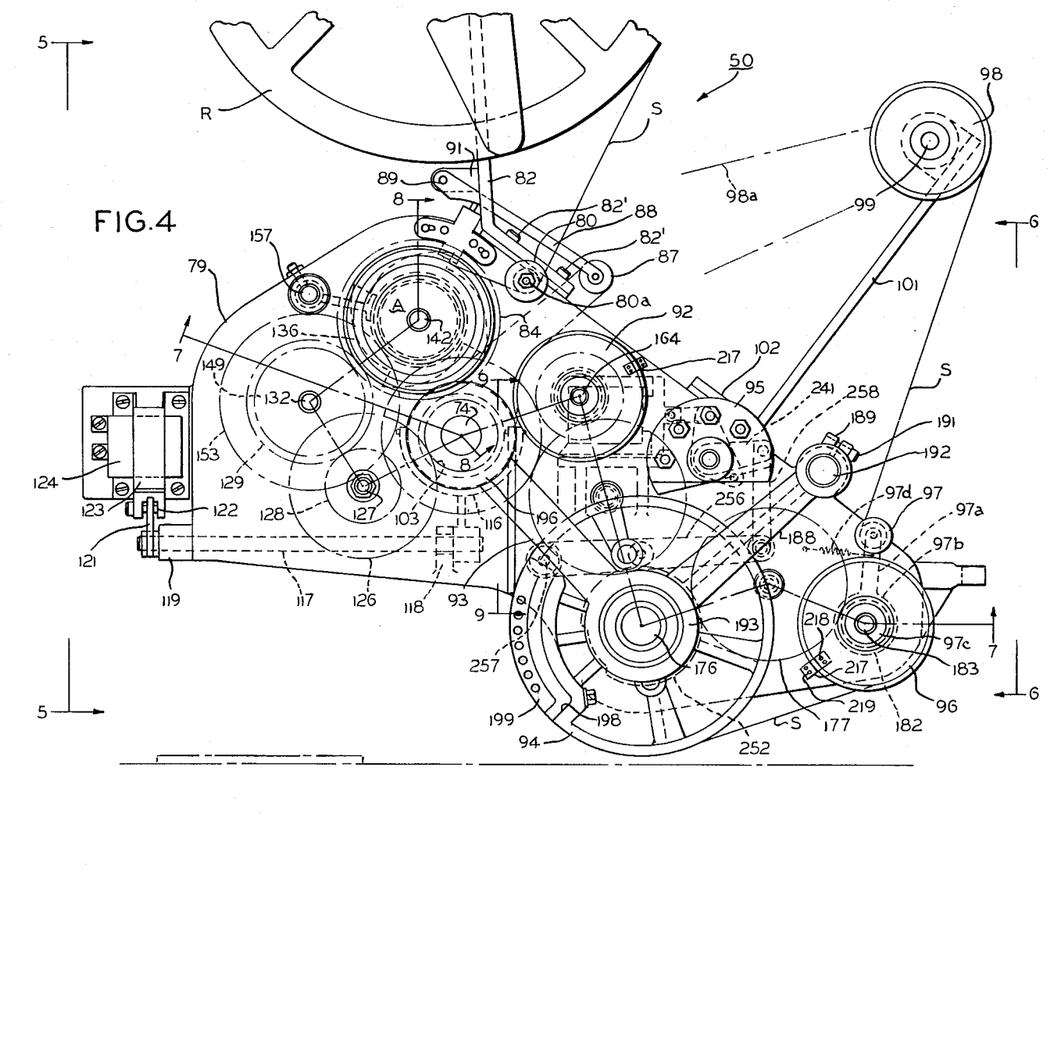
FIG. 4 is a front elevational view showing details of an addressing head adapted to be used with the machine of FIG. 1.

The flange 81 has an arm 82 secured thereto by screws 82', arm 82 supporting a journal pin 83, see FIG. 4, at the top thereof for a reel R of the address strip seen in FIG. 2. The strip S is led from the reel R, and is trained about an idler roller 80 mounted on a stub shaft 80A supported on front frame 79. The strip S is then led around a pin roller 84 having pins 86 protruding therefrom which engage perforations P in the address strip S. The strip S is further trained about an idler roller 87 mounted at the end of a follower arm 88, see also FIG. 13, pivoted at 89 to a bracket 91 extending from the reel support arm 82.

The two frames 78 and 79 are pivoted as a unit about the main drive shaft 74 so that the impression roller 94 may be raised and lowered according to the thickness of the book B. An ear 100, see FIGS. 6 and 18, extends from flange 81 and an adjusting screw 100A is threaded into ear 100 and bears against a rod 100B extending between supports 100C extending up from table 31, enabling the frames 78 and 79 to be raised and lowered as desired.

The strip S is then led past a first vacuum feed roller assembly 92, thence past a vacuum brake 93, see FIGS. 9 and 10, thence past a heated impression roller 94, the strip S being subsequently led past a second vacuum feed roller assembly 96, and past a spring biased idler roller 97. An arm 97A supporting idler roller 97 has a hub 97B supported on a shaft 97C supporting the suction feed roller 96, and is biased in a counterclockwise direction by a spring 97d connected to arm 97A and to front frame 79 in any convenient manner. The strip S is then reeled upon a take-up reel 98 supported on a shaft 99 extending from a support arm 101 secured at a foot 102 to the flange 81.

The vacuum feed roller assemblies 92 and 96 operate conjointly to advance a discrete address A of the strip S into register with the book B, the peripheral speed of the impression roller being the same as that of the book B and also of the strip S. The conjointly acting vacuum feed roller assemblies 92 and 96 alternate in operation with the vacuum brake 93, so that the strip S is braked by the vacuum brake 93 and then advanced to proper register position by the vacuum feed roller assemblies 92 and 96.

A vacuum control valve 95, see FIGS. 4, 14, 15 and 16, controls the vacuum at the vacuum feed roller assemblies 92 and 96 and the vacuum brake 93, as will be described in more detail in this application.

Figure 7:
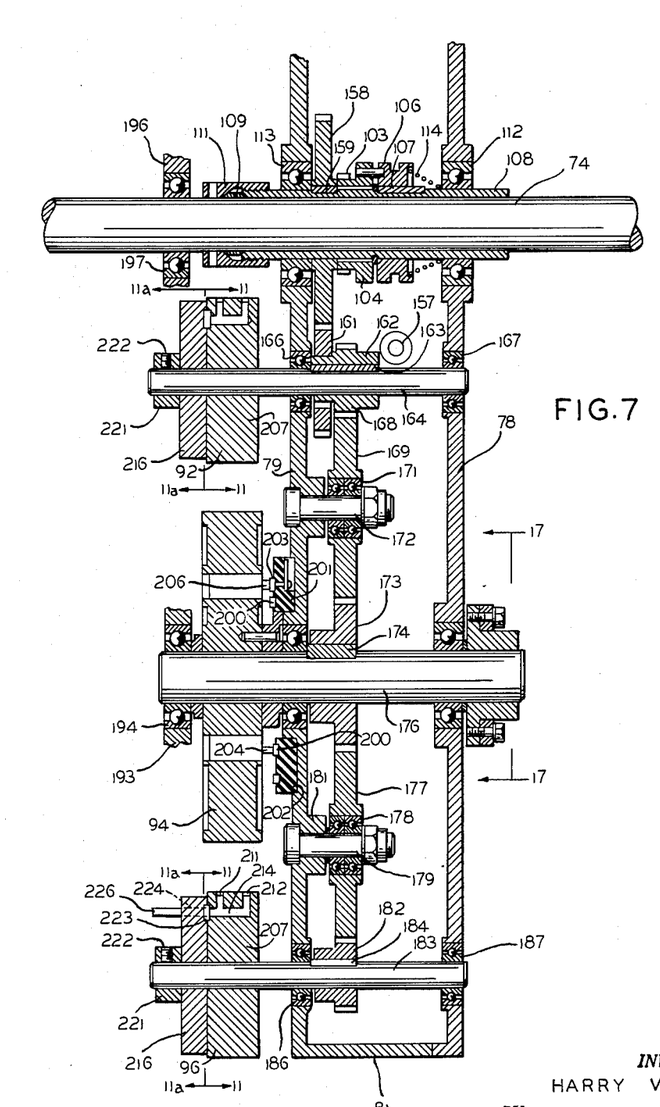
FIG. 7 is a section taken along the line 7—7 of FIG. 4.
Figure 8:
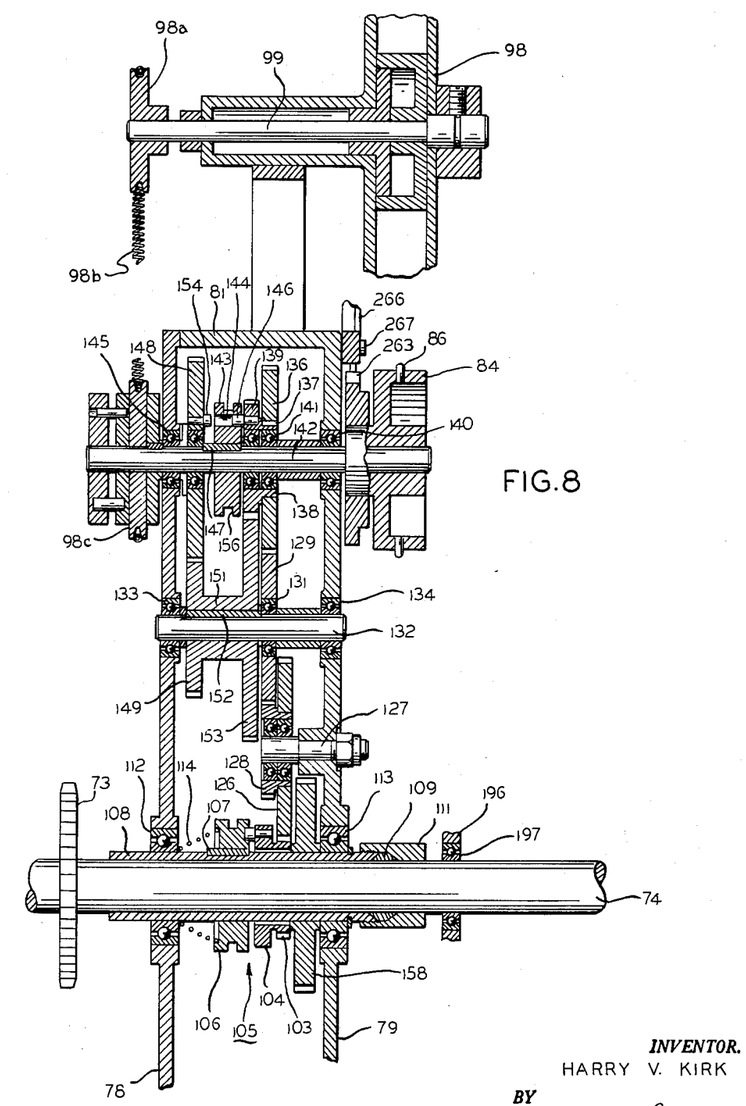
FIG. 8 is a section taken along the line 8—8 of FIG. 4.

Structure is provided for applying driving effort to the pin roller 84, and vacuum feed roller assemblies 92 and 96 and the impression roller 94, and to this end the shaft 74 supports a driving pinion 103, see FIGS. 7 and 8, which is connected to the driving shaft 74 by means of a pin clutch 105 comprising a driven clutch member 104 integral with the pinion 103, and a clutch throw-out member 106 which is held by a key 107 to a sleeve 108 made fast to the shaft 74 by means of compression coupling members 109 and 111, coupling member 111 being threaded to the sleeve 108. Bearings 112 and 113 support the sleeve and the shaft 74 in their respective frames 78 and 79, see FIG. 8.

The clutch throw-out member 106 is shifted on the key 107 against the bias of the conical spring 114, the spring 114 being biased between the bearing 112 and the throw-out member 106. A shifter yoke 116 pivots with a rock shaft 117 held in supports 118 and 119, see also FIG. 4. Rock shaft 117 has a rock lever 121 fast thereto, rock lever 121 being pivotally connected at 122 to an armature 123 of a solenoid 124. Energization of the solenoid 124 is had when there is irregular spacing of the books B to disengage the clutch driving member 106 from the driven member 104, as will be described.

The driving pinion 103 meshes with an idler gear 126 mounted on a stub shaft 127 supported in the front frame 79, see FIG. 8. Gear 126 is integral with a pinion 128 meshing with an idler gear 129 supported on a bearing 131 in turn supported upon an idler shaft 132 supported in bearings 133 and 134 mounted in the respective front and rear frame members 78 and 79.

Idler gear 129 meshes with a gear 136 held fast by a key 137 to a hub 138 of a pinion 139. Hub 138 turns on bearings 141 supported on a shaft 142 having the pin roller 84 fast thereto. Shaft 142 is supported in the front and rear frames 79 and 78 upon bearings 140 and 145. A connection is made between the pinion 139 and the shaft 142 by means of a clutching collar 143 having a drilled passage 144 therein adapted to receive a pin 146 supported by the pinion 139. Clutching collar 143 is fast to shaft 142 but slides on a key 147 with respect to shaft 142.

Figure 3:
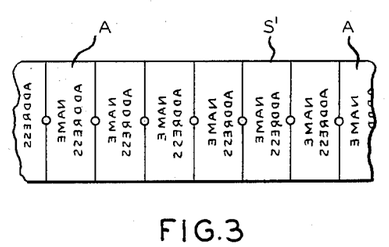
FIG. 3 shows another type of strip adapted to be used with the machine of FIG. 1.
Figures 5, 6:
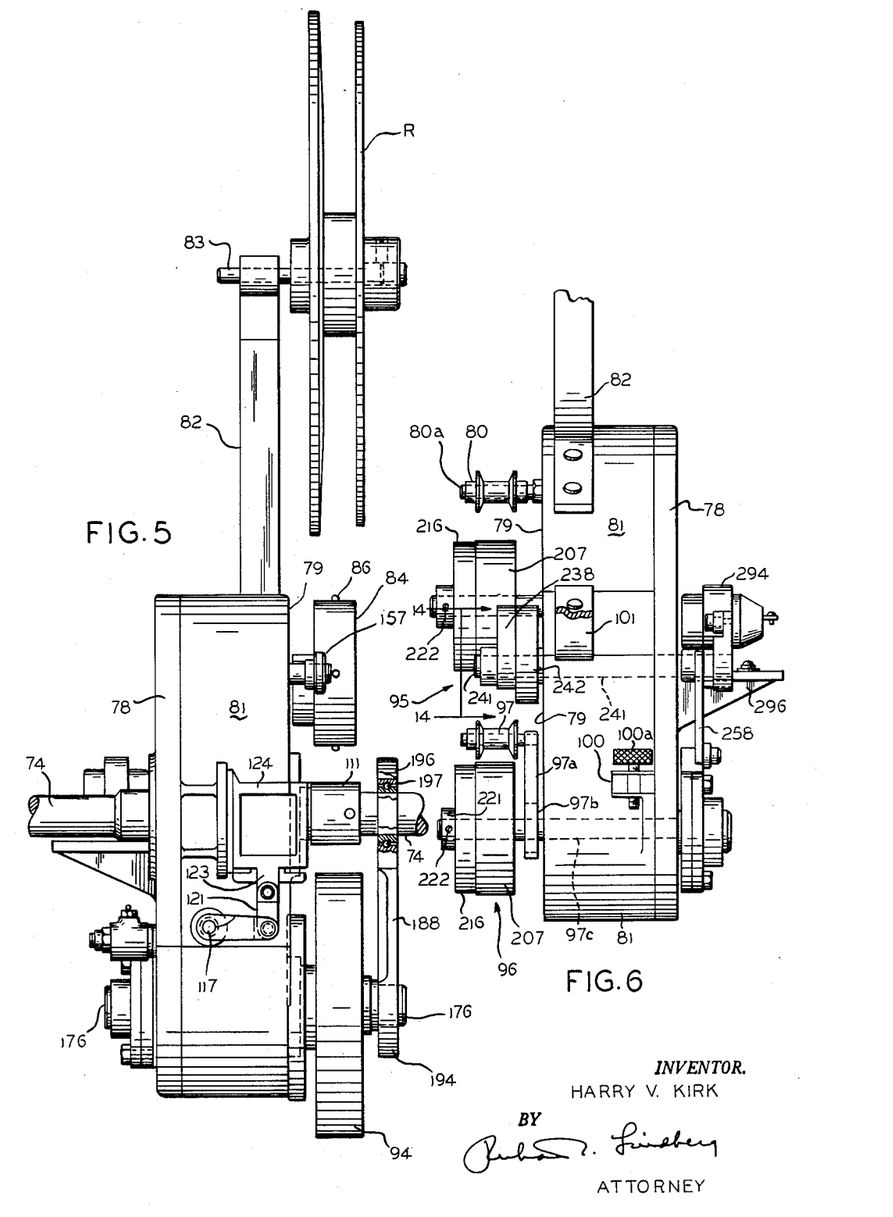
FIG. 5 is a side elevational view looking in the direction of the arrows 5—5 of FIG. 4.
FIG. 6 is an opposite side elevational view looking in the direction of the arrows 6—6 of FIG. 4.

It will be seen from the description thus far that a driving connection is provided between the main drive shaft 74 and the pin roller 84 so as to advance the strip S. The gear train thus far described is for a strip S of the type as seen in FIG. 2, but the addressing head described herein is also adapted to employ a strip S' as seen in FIG. 3, and in such cases the pin roller 84 instead of having four pins 86, as seen in FIG. 5, has twelve pins. In such cases the face width of the pin roller 84 is changed in accordance with the wider width of the address strip S'. Likewise the reel R is also varied to accommodate a wider width of strip S'. The impression roller 94, the brake 93 and the vacuum feed rollers 92 and 96, as are all the elements contacting strip S', are also changed in face width to accommodate such wider strip S'.

Structure is provided for changing the speed of the pin roller 84 in accordance with the wider strip S', and to this end the throw-out collar 143 is adapted to engage a change speed gear 148, gear 148 meshing with a gear 149 of a cluster gear assembly 151 held fast to the shaft 132 by a key 152. Gear cluster 151 has a gear 153 which meshes with the pinion 139.

Structure is provided for moving clutching collar 143 to a position of engagement of its recess 144 with a pin 154 on the gear 148, and to this end the clutching collar 143 has a annular groove 156 which cooperates with a translatively movable gear change device 157, see FIG. 5, which shifts a throw-out yoke, not shown, engageable with the annular groove 156.

It will be seen that this latter drive assembly moves the pin roller at a lower speed corresponding to the smaller feed distance of the wider strip S'.

Main shaft 74 also drives a gear 158 fast on the sleeve 108, see FIG. 7, by means of a key 159. Gear 158 meshes with a pinion 161 fast on a hub 162 held by a key 163 to a shaft 164 supporting the first suction feed roller 92. Shaft 164 is supported in spaced bearings 166 and 167 held respectively in the front frame 79 and the back frame 78. A pinion 168 is integral with the hub 162, and meshes with an idler gear 169 supported in bearings 171 in turn supported on a stub shaft 172, held in the front frame 79.

Gear 169 meshes with a pinion 173 held by a key 174 to a shaft 176 having the impression roller 94 fast thereon. Pinion 173 meshes with an idler gear 177 turning on bearings 178 supported on a stub shaft 179 in turn held in a boss 181 extending inward from the front frame 79. Idler gear 177 meshes with a pinion 182 held fast to a shaft 183 by means of a key 184. Shaft 183 is held in bearings 186 and 187 mounted in the respective front frame 79 and back frame 78, and has the second vacuum feed roller 96 fast thereon.

Structure is provided for lending support to those portions of the shafts 74 and 176 protruding beyond the front frame 179, and to this end a V-shaped frame 188 has a split collar 189 at one end thereof adapted to be held by a clamping screw 191 to a boss 192 extending from the front frame 79, see FIG. 4. V-frame 188 has a bearing boss 193, see FIG. 7, supporting a bearing 194 in turn supporting the shaft 176. The other end of the V-frame 188 has a bearing boss 196 supporting a bearing 197 in turn supporting the shaft 74, see also FIG. 5.

*Details of heat impression roller*

The heat impression roller 94, see FIG. 4, has a cut out arcuate segment 198 providing a recess for an arcuate heating element 199. The heating element 199 has resistance wires embedded therein, not shown, which are supplied with energy by means of a stationary insulating ring 201, see FIG. 7, held in an annular recess 202 in the front frame 29. The ring 201 supports inner and outer annular slip rings 200 and 203, inner annular ring 200 cooperating with a brush 204, and outer ring 203 cooperating with a similar brush 206 to supply power to the heating elements located within the heating element 199.

*Details of rotary vacuum feed rollers*

Figure 11:
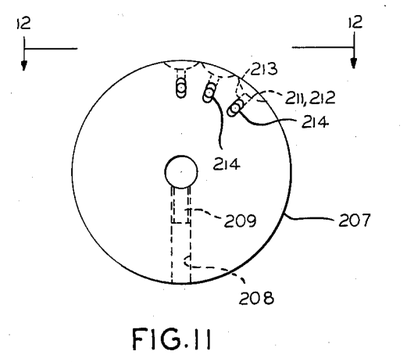
FIG. 11 is a view looking in the direction of the arrows 11—11 of FIG. 7, showing details of a vacuum feed roller for moving the strip seen in FIG. 2.

The rotary vacuum feed roller assemblies 92 and 96, see FIG. 11, each comprise a vacuum feed roller 207 which is radially drilled at 208 to receive a set screw 209 for holding rollers 207 to the respective shafts 164 and 183. Each of the rollers 207 has a number of laterally spaced receses 211 and 212 in the face thereof which extend for a distance along the periphery thereof. The roller is drilled radially at 213 at each such recess 212 to intersect with a passageway 214 drilled parallel to the axis of rotation of the roller 207. The passageways 214, see also FIG. 7, cooperate with a stationary suction manifold member 216, see FIG. 11A, which is held against rotation upon the respective shafts 164 and 183 by a bracket 217 held by screws 218 to the manifold member 216, and by screws 219 to the front frame 79, see FIG. 4. A holding collar 221 held by a set screw 222 to the respective shafts 164 and 183 holds the suction valve member 216 against the vacuum feed roller 207.

Figure 11A:
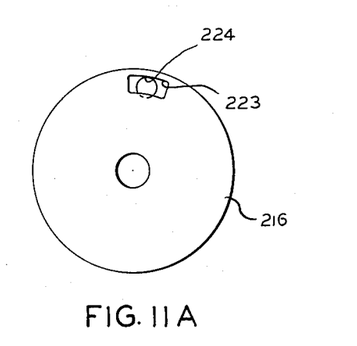
FIG. 11A is a view looking in the direction of the arrows 11A—11A of FIG. 7, showing details of a valve for the roller of FIG. 11.
Figure 12:
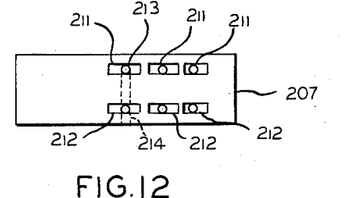
FIG. 12 is a view looking in the direction of the arrows 12—12 of FIG. 11, showing further details of the vacuum feed roller.

The suction valve member 216, see FIG. 11A, has an arcuate suction port 223 therein which is intersected by a passageway 224 connected by a suction line 226 to the vacuum control valve 95, the suction in line 226 being controlled, as will be described, by valve 95 to cause the strip S to be firmly held to the periphery of the roller 207 and to be advanced with respect to the impression roller 94, so that a discrete address A on the strip S is in proper register with a moving book B.

The strip S which has been moved past the vacuum roller assembly 96 is trained past the idler roller 97 and on to the take-up reel 98. The idler roller 97 is mounted at the end of the arm 97A having a hub 97B which is supported on the shaft 183 for the suction roller assembly 96. Arm 97A is biased in a counterclockwise direction by the spring 97D which is anchored to the front frame at any convenient point, and the idler roller 97 serves to place a proper amount of tension on the strip S which is wound upon the takeup reel 98.

Take-up reel 98, see also FIG. 8, is driven by a pulley 98A driven by a spring belt 98B reeved between pulley 98A and a pulley 98C fast on the shaft 142.

Figure 13:
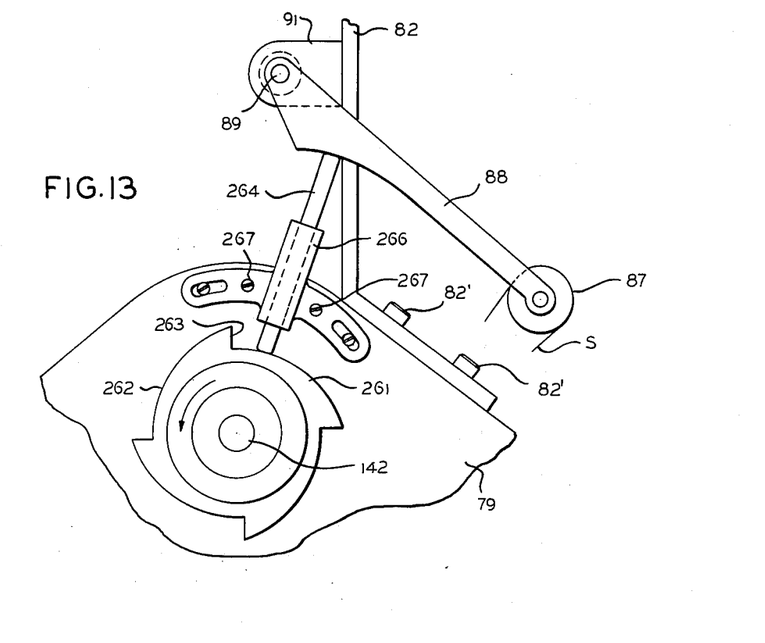
FIG. 13 is a view showing details of a cam and follower mechanism for changing the length of a bight in the address strip.

The feed movement of the pin roller 84 and the intermittent feed movement of the suction roller assemblies 92 and 96 and brake 93 are such as to create a bight of changing length between the pin roller 84 and the suction roller 92 of the strip S. This bight is changed in length in accordance with the braking of the strip S and the movement thereof by the vacuum roller assemblies 92 and 96. While the strip S is held by the brake 93 the pin roller 84 continues to turn, and structure is accordingly provided for rocking the lever 88 about its pivot point 89 so as to accommodate the lengthening of the strip S between the pin roller 84 and suction roller assembly 92. To this end the shaft 142, see FIGS. 8 and 13, has a four lobe cam 261 which rotates with the shaft 142 in the direction as shown in FIG. 13. The profiles 262 between the cam lobes 263 serve to raise a push rod 264 which moves in a guide 266 held by screws 267 to the front frame 79. As the cam 261 rotates in a counter-clockwise direction, the push rod 264 rocks the arm 88 in a counter-clockwise direction to lengthen the bight on the strip S. During this time the brake 93 is effective to hold the strip S stationary, and when the push rod 264 reaches the cam lobe 263 it is forced by the weight of the arm 88 down against the following cam profile path. At this time the suction roller assemblies 92 and 96 are ready to advance the strip S into position with respect to the impression roller 94, so that an impression can be taken from a discrete address A on the strip S.

*Details of strip brake*

Figure 9:
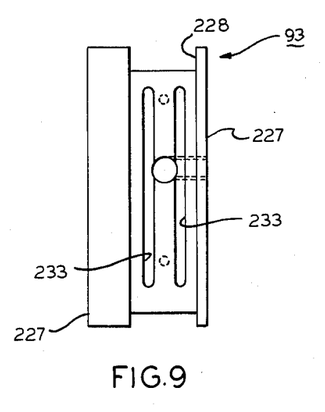
FIG. 9 is an elevational view looking in the direction of the arrows 9—9 of FIG. 4, showing details of a brake for holding the address strip.
Figure 10:
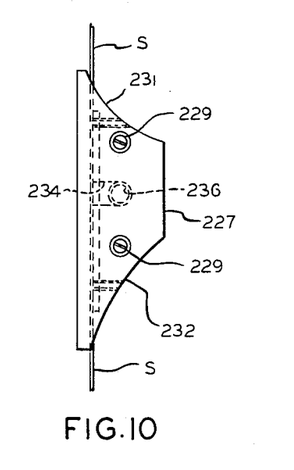
FIG. 10 is a side elevational view thereof.

The vacuum brake 93, see FIGS. 9 and 10, consists of a body member 227 having a guideway 228 for the strip S. The body member 227 is held to the front frame 79 by means of cap screws 229, and is curved at 231 and 232 at its upper and lower extremities, so as to clear suction roller assembly 92 and impression roller 94. The guideway 228 has elongated slots 233 therein which are connected by a passageway 234 to a port 236 to which a vacuum pressure line 237 is connected, the latter line being connected to the control valve 95.

*Details of vacuum control valve for vacuum feed rollers*

Figure 14:
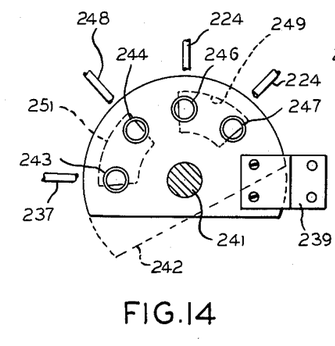
FIG. 14 is an elevational view looking in the direction of the arrows 14—14 of FIG. 6, showing details of a vacuum distributing valve for determining feeding and braking movement of the address strip seen in FIGS. 2 and 3.
Figure 15:
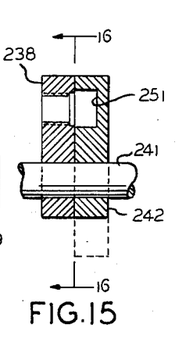
FIG. 15 is a side view thereof.
Figure 16:
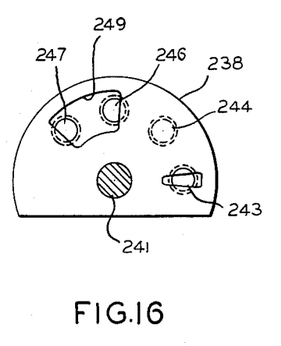
FIG. 16 is a detail view looking in the direction of the arrows 16—16 of FIG. 15.

The vacuum control valve 95 for the movement of the strip S is shown with reference to FIGS. 14 to 16 inclusive, and includes a stationary valve member 238 held by a bracket 239 to the front frame 79. Stationary valve member 238 also affords a support for a shaft 241 which has a rotating valve member 242 fast thereto and rockable therewith.

The fixed valve member 238 has ports 243, 244, 246 and 247 spaced angularly therein. Port 243 is connected by the suction line 237 to the vacuum brake 93 seen in FIGS. 9 and 10, and port 244 is connected by a line 248 to a central source of vacuum pressure. Ports 246 and 247 are each connected by the leads 224 to the vacuum roller assemblies 92 and 96, and these lines are connected within the stationary valve member 238 by means of a passageway 249.

As the shaft 241 rocks the movable valve member 242 to the position seen in FIG. 14, the suction at the line 248 is connected to the brake 93 by a passageway 251 in the movable valve member 242. At this time the strip S is held immobile by the brake 93.

As the movable valve member 242 rocks to the clockwise direction as seen in FIG. 14 to a position where the passageway 251 intersects first port 246 and then both the ports 246 and 247, the vacuum at the brake 93 will first be released and then applied at the suction roller assemblies 92 and 96 so as to advance the strip S with respect to the impression roller 94, and so that it is in proper register with the impression roller 94 and the book B.

Figure 17:
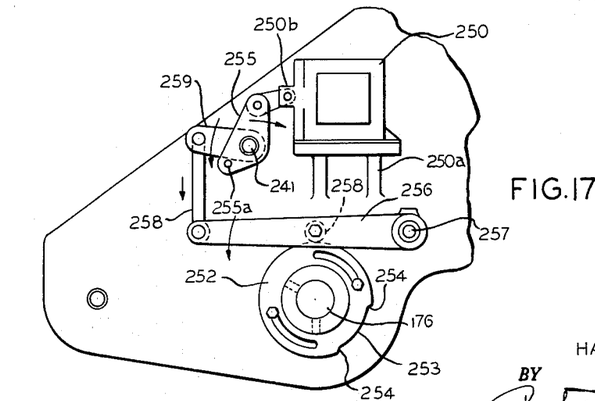
FIG. 17 is an elevational view showing details of mechanism for controlling the operation of the valve seen in FIGS. 14 to 16 inclusive.

The shaft 241 is rocked in the manner just described in timed sequence to the rotation of the impression roller 94 and the movement of the books B, and to this end the impression roller shaft 176, see FIG. 17, supports a rotary cam 252 having a circular camming surface 253 of smaller diameter between a pair of spaced lobes 254. The cam 252 cooperates with a follower arm 256 pivoted on a stub shaft 257 supported on back frame 78, and having a cam follower roller 258 approximately mid-way of the length thereof, and following the contour of the cam 252.

The follower arm 256 is pivotally connected to a link 258 which in turn is pivotally connected to a rock arm 259 fast to the rock shaft 241, see also FIG. 4.

It may be noted that when the cam follower roller 248 is on the surface of the cam 252 that the control valve 95 is then in a position where the movable valve element 242 is rocked to a position where suction as applied to the suction roller assemblies 92 and 96 so as to advance the strip S. It may be noted also that when the cam follower roller 258 is on that portion of the cam 252 having the greater radius, that the movable valve member 242 is rocked to a position where the suction is applied to the brake 93 and strip S to stop the same.

Structure is provided to insure that the strip S is stopped in its movement upon the occurrence of a "miss" in the books B, and to this end a solenoid 250 is energized by control means as will be described. Solenoid 250 is supported on a bracket 250A, and has an armature 250B pivotally connected to a rock arm 255 supported on shaft 241. Rock arm 255 has a pin 255A extending therefrom, and upon energization of solenoid 250 rock arm 255 moves in a clockwise direction to raise rock arm 259 and rock the shaft 241 in a clockwise direction as seen in FIG. 17 to apply suction to brake 93. This same operation of solenoid 250 lifts follower arm 258 out of contact with cam 252.

Details of lower pressure roller

At the time of register of the discrete address A with the book B, address A being in position between the impression roller 94 and the book B, a lower pressure roller 271 is brought into contact against the lower side of the book B so as to insure good contact with the discrete address A and the book B. Referring now to FIGS. 17 and 18, the lower pressure roller 271 is fast on a shaft 272 supported at its ends in sliding journals 273. Spaced vertical guides 274 for guiding sliding journals 273 are supported from the lower side of the table 31.

The roller 271 is arranged to have vertical movement in its guides 274 in timed relation to the movement of the book B, so that pressure is placed thereon by the roller 271 as well as by the impression roller 94, and to this end the roller 271 is given such vertical movement by means of a cam follower lever 276 supported on a rock shaft 277.

Cam follower lever 276 has a follower roller 278 at one end thereof which follows a rotating cam 279 fast on the main drive shaft 66. Journal 273 has a member 282 dependent therefrom, and a pin 283 extending from the member 282 engages an end 284 of the cam lever 276. Normally the contour of the cam 279 is such as to rock the lever 276 against the bias of a spring 286 to maintain the pressure roller 271 in the retracted position. However, the cam 279 has a profile 287 which causes the lever 276 to rock slightly in a counter-clockwise direction, the force in the spring 286 causing the roller 271 to rest against the underside of the book B.

Structure is provided for maintaining the roller 271 in the lower position upon a "miss" in feeding of the book B, and to this end a solenoid 288 has an armature 289 pivotally connected to a rock arm 291 fast on a rock shaft 292. A latching finger 293, also fast on the rock shaft 292, engages the end 284 of the cam lever 276 to maintain it rocked in a position so as to keep the roller 271 retracted.

Control for the addressing head

The addressing head 50 and the operable elements thereof are all under the control of a sensing switch SW, see FIG. 1, which is actuated each time the book B passes therebeneath. It may be understood, of course, that photoelectric or other means may be employed for sensing the presence of a book B. Irrespective of the sensing means employed, a "miss" in the feeding of the book B causes the addressing head 50 to discontinue the feeding of the strip S at the same time the lower pressure roller 271 is maintained in the retracted position, until the books B are once more regularly fed. Upon the occurrence of a "miss" in the books B, switch SW fails to be actuated and it is connected in circuitry, not shown, which energizes the solenoid 288 so as to maintain the lower pressure roller 271 in the retracted position. At the same time the solenoid 250, see FIG. 17, is energized to move its armature 250B to the right. This operation of the solenoid 250 causes the suction to be manifested against the brake 93 to stop the strip S, as previously described.

At the same time solenoid 124, see FIG. 4, is energized to rock the shaft 117 to cause the clutch on the main drive shaft 74 to be disengaged, see FIG. 8. This stops the feed movement of the pin roller 84 as well as the rotation of the vacuum valve assemblies 92 and 96. All of the parts will remain in the immobile position until the switch SW is once more actuated at which time the proper sequence of operation occurs once more.

Summary

It will be apparent from the description foregoing that there has been provided some new and useful improvements in the art of applying addresses to mailing pieces. The strip adapted for use with the structure of the present invention may be used a number of times to take successive impressions therefrom until a new strip is prepared by reason of changes for subscribers' lists or the like.

While the invention has been described in terms of a preferred embodiment thereof, it is to be understood that the scope of the invention is not limited by the precise embodiment herein shown, nor otherwise, than by the scope of the claims here appended.

I claim as my invention:

1. In a machine for applying intelligence from an intelligence bearing strip having discrete intelligence portions thereon formed of reverse images capable of being transferred to moving articles, means for conveying said articles, means for applying discrete intelligence to each article comprising means for feeding said intelligence bearing strip, means for moving a portion of said strip in step by step fashion, means for applying pressure to a discrete intelligence portion on the said strip portion, said discrete intelligence portion of said strip being adapted to move into contact with an article while the same is moving and between said pressure applying means and said article, means for holding said strip portion stationary while said feeding means feeds an additional length of strip between said feeding means and said strip portion moving means, said strip portion moving means being operable to advance said strip portion when said holding means is inoperable, and being inoperable when said holding means is operable.

2. In a machine for applying intelligence from an intelligence bearing strip having discrete intelligence portions thereon formed of reverse images capable of being transferred to moving articles, means for conveying said articles, means for applying discrete intelligence to each article comprising means for feeding said intelligence bearing strip, means for moving a portion of said strip in step-by-step fashion, means for applying heat and pressure to a discrete intelligence portion on the said strip portion, said discrete intelligence portion of said strip being adapted to move in contact with an article while the same is moving and between said heat and pressure applying means and said article, means for holding said strip portion stationary while said feeding means feeds an additional length of strip between said feeding means and said strip portion feeding means, said strip portion moving means being operable to advance said strip portion when said holding means is inoperable, and being inoperable when said holding means is operable.

3. In a machine for applying intelligence from an intelligence bearing strip having discrete intelligence portions thereon formed of reverse images capable of being transferred to moving articles, means for conveying said articles, means for applying discrete intelligence to each article comprising means for feeding said intelligence bearing strip, means for applying pressure to a discrete intelligence portion on the said strip, means disposed to each side of said pressure applying means for moving a portion of said strip in step-by-step fashion, said discrete intelligence portion of said strip being adapted to move into contact with an article while the same is moving and between said pressure applying means and said article, means for holding said strip portion stationary while said feeding means feeds an additional length of strip between said feeding means and said strip portion moving means, said strip portion moving means being operable to advance said strip portion when said holding means is inoperable, and being inoperable when said holding means is operable.

4. In a machine for applying intelligence from an intelligence bearing strip having discrete intelligence portions thereon formed of reverse images capable of being transferred to moving articles, means for conveying said articles, means for applying discrete intelligence to each article comprising means for feeding said intelligence bearing strip, means for moving a portion of said strip in step-by-step fashion, means for applying pressure to a discrete intelligence portion on said strip, said discrete intelligence portion of said strip being adapted to move into contact with said article while the same is moving and between said pressure applying means and said article, means disposed between said strip portion moving means and said strip pressure applying means for holding said strip portion stationary while said feeding means feeds an additional length of strip between said feeding means and said strip moving means, said strip moving means being operable to advance said strip portion when said holding means is operable.

5. In a machine for applying intelligence from an intelligence bearing strip having discrete intelligence portions thereon formed of reverse images capable of being transferred to moving articles, means for conveying said articles, means for applying discrete intelligence to each article comprising means for feeding said intelligence bearing strip, means for moving a portion of said strip in step-by-step fashion, means for applying pressure to a discrete intelligence portion on said strip portion, means disposed to each side of said pressure applying means for moving said strip portion in step-by-step fashion, said discrete portion of said strip portion being adapted to move into contact with an article while the same is moving and between said pressure applying means and said article, means disposed between one of said strip moving means and said strip pressure applying means for holding said strip portion stationary while said feeding means feeds an additional length of strip between said feeding means and the said one of said strip moving means, said strip moving means being operable to advance said strip portion when said holding means is inoperable, and being inoperable when said holding means is operable.

6. In a machine for applying intelligence from an intelligence bearing strip having discrete intelligence portions thereon formed of reverse images capable of being transferred to moving articles, means for conveying said articles, means for applying discrete intelligence to each article comprising means for feeding said intelligence bearing strip, means for moving a portion of said strip in step by step fashion, means for applying pressure to a discrete intelligence portion on said strip portion, said discrete intelligence portion of said strip portion being adapted to move into contact with said article while the same is moving and between said pressure applying means and said article, means for holding said strip portion stationary while said feeding means feeds an additional length of strip between said feeding means and said strip moving means, said strip moving means being operable to advance said strip portion when said holding means is inoperable, and being inoperable when said holding means is operable, and means operable by said strip feeding means for providing a bight in said additional length of said strip when said holding means is operable.

7. In a machine for applying intelligence from an intelligence bearing strip having discrete intelligence portions thereon formed of reverse images capable of being transferred to moving articles, means for conveying said articles, means for applying discrete intelligence to each article comprising means for feeding said intelligence bearing strip, means for moving a portion of said strip in step by step fashion, means for applying pressure to a discrete intelligence portion on said strip portion, said discrete intelligence portion of said strip portion being adapted to move into contact with an article while the same is moving and between said pressure applying means and said article, means for holding said strip portion stationary while said feeding means feeds an additional length of strip between said feeding means and said strip moving means, said strip moving means being operable to advance said strip portion when said holding means is inoperable, and being inoperable when said holding means is operable, and means operable by said strip feeding means for providing a bight in said additional length of strip when said holding means is operable, said last named means being movable to a position to provide for shortening of said bight when said strip moving means is operable and said strip holding means is inoperable.

8. In a machine for applying intelligence from an intelligence bearing strip having discrete intelligence portions thereon formed of reverse images capable of being transferred to moving articles, means for conveying said articles, means for applying discrete intelligence to each article comprising means for feeding said intelligence bearing strip, means for moving a portion of said strip in step by step fashion, means for applying pressure to a discrete intelligence portion on said strip portion, said discrete intelligence portion of said strip portion being adapted to move into contact with an article while the same is moving and between said pressure applying means and said article, means for holding said strip portion stationary while said feeding means feeds an additional length of strip between said feeding means and said strip moving means, said strip moving means being operable to advance said strip portion when said holding means is inoperable, and being inoperable when said holding means is operable, and means for rendering said discrete intelligence applying means inoperable when said articles are conveyed at irregularly spaced intervals.

9. In a machine for applying intelligence from an intelligence bearing strip having discrete intelligence portions thereon formed of reverse images capable of being transferred to articles, said strip having regularly spaced perforations therein separating said discrete intelligence portions, means for conveying said articles, means for applying discrete intelligence to each article comprising a pin roller for engaging said perforations to feed said intelligence bearing strip, vacuum roller means for moving a portion of said strip in step by step fashion, an impression roller for applying pressure to a discrete intelligence portion on said strip portion, said discrete intelligence portion of said strip portion being adapted to move into contact with an article while the same is moving and between said impression roller and said article, vacuum means for holding said strip portion stationary while said pin roller feeds an additional length of strip between said pin roller and said vacuum roller means, said vacuum roller means being operable to advance said strip when said vacuum holding means is inoperable, and being inoperable when said vacuum holding means is operable.

10. In a machine for applying intelligence from an intelligence bearing strip having discrete intelligence portions thereon formed of reverse images capable of being transferred to articles, said strip having regularly spaced perforations therein separating said discrete intelligence portions, means for conveying said articles, means for applying discrete intelligence to each article comprising a pin roller for engaging said perforations to feed said intelligence bearing strip, an impression roller for applying pressure to a discrete intelligence portion on said strip, vacuum roller means disposed to each side of said impression roller for moving a portion of said strip in step by step fashion past said impression roller, said discrete intelligence portion of said strip portion being adapted to move into contact with an article while the same is moving and between said impression roller and said article, vacuum means for holding said strip portion stationary while said feeding means feeds an additional length of strip between said feeding means and said vacuum roller means, said vacuum roller means being operable to advance said strip when said vacuum holding means is inoperable, and being inoperable when said vacuum holding means is operable.

11. In a machine for applying intelligence from an intelligence bearing strip having discrete intelligence portions thereon formed of reverse images capable of being transferred to articles, said strip having regularly spaced perforations therein separating said discrete intelligence portions, means for conveying said articles, means for applying discrete intelligence to each article comprising a pin roller engaging said perforations to feed said intelligence bearing strip, an impression roller for applying pressure to a discrete intelligence portion on said strip, vacuum roller means disposed on each side of said impression roller for moving a portion of said strip in step by step fashion past said impression roller, said discrete intelligence portion of said strip being adapted to move into contact with an article while the same is moving and between said impression roller and said article, vacuum means disposed between said impression roller and one of said vaccum roller means for holding said strip portion stationary while said pin roller feeds a length of strip between said pin roller and the said one of said vacuum roller means, said vacuum roller means being operable to advance said strip when said vacuum holding means is inoperable, and being inoperable when said vacuum holding means is operable.

12. In a head for applying intelligence to an article from a discrete bit of intelligence on an intelligence bearing strip having the intelligence thereon formed in reverse images capable of transfer to said article, said head comprising means for feeding said intelligence bearing strip, means for moving a portion of said strip in step in step by step fashion, roller means for rolling a discrete portion of said strip portion into contact with said article while the same is moving and between said roller means and said article, means for holding said strip portion stationary while said feeding means feeds an additional length of strip, said strip moving means being operable to advance said strip portion when said holding means is inoperable, and being inoperable when said holding means is operable.

13. In a head for applying intelligence to an article from a discrete bit of intelligence on an intelligence bearing strip having the intelligence thereon formed in reverse images capable of transfer to said article, said head comprising means for feeding said intelligence bearing strip, means for moving a portion of said strip in step-by-step fashion, means for applying heat and pressure to a discrete portion of said strip portion while rolling said portion into contact with said article when the same is moving and between said heat and pressure applying means and said article, means for holding said strip portion stationary while said feeding means feed an additional length of strip, said strip moving means being operable to advance said strip portion when said holding means is inoperable, and being inoperable when said holding means is operable.

14. In a head for applying intelligence to an article from a discrete bit of intelligence on an intelligence bearing strip having the intelligence thereon formed in reverse images capable of transfer to said article, said head comprising means for feeding said intelligence bearing strip, means for applying pressure to a discrete portion of said strip, means disposed to each side of said pressure applying means for moving a portion of said strip in step by step fashion, said discrete portion of said strip portion being adapted to move into contact with said article while the same is moving and between said pressure applying means and said article, means for holding said strip portion stationary while said feeding means feeds an additional length of strip, said strip moving means being operable to advance said strip portion when said holding means is inoperable, and being inoperable when said holding means is operable.

15. In a head for applying intelligence to an article from a discrete bit of intelligence on an intelligence bearing strip having the intelligence thereon formed in reverse images capable of transfer to said article, said head comprising means for feeding said intelligence bearing strip, means for moving a portion of said strip in step by step fashion, roller means for rolling a discrete portion of said strip while placing pressure thereon into contact with a mailing piece while the same is moving and between said roller means and said article, means disposed between said strip portion moving means and said roller means for holding said strip portion stationary while said feeding means feeds an additional length of strip, said holding means being operable to advance said strip portion when said holding means is inoperable, and being inoperable when said holding means is operable.

16. In a head for applying intelligence to an article from a discrete bit of intelligence on an intelligence bearing strip having the intelligence thereon formed in reverse images capable of transfer to said article, said strip having regularly spaced perforations therein separating said discrete bits of intelligence, said head comprising means for feeding said intelligence bearing strip, means for placing pressure upon a discrete portion of said strip, means disposed to each side of said pressure placing means for moving said strip step by step, said discrete portion of said strip being adapted to move into contact with an article and between said pressure placing means and said article, means disposed between one of said strip moving means and said strip pressure placing means for holding said strip stationary while said feeding means feeds a length of strip between said holding means and one of said strip moving means, said strip moving means being operable to advance said strip when said holding means is inoperable, and being inoperable when said holding means is operable.

17. In a head for applying intelligence to an article from a discrete bit of intelligence on an intelligence bearing strip having the intelligence thereon formed in reverse images capable of transfer to said article, said strip having regularly spaced perforations therein separating said discrete bits of intelligence, said head comprising a pin roller engaging said perforations to feed said intelligence bearing strip, vacuum roller means for moving a portion of said strip step by step, an impression roller for heating a discrete portion of said strip portion, and placing pressure thereon, said discrete portion of said strip being adapted to move into contact with said article while the same is moving and between said impression roller and said article, vacuum means for holding said strip portion stationary while said pin roller feeds an additional length of strip between said pin roller and said vacuum roller means, said vacuum roller means being operable to advance said strip when said vacuum holding means is inoperable, and being inoperable when said holding means is operable.

18. An addressing head for applying an address to a mailing piece from a discrete address of an address strip having the addresses thereof formed in reverse images capable of transfer to said mailing pieces by heat and pressure, said strip having regularly spaced perforations therein separating said discrete addresses, said addressing head comprising a pin roller engaging said perforations to said address strip, said discrete address of said strip being adapted to move into contact with mailing pieces and between said heating means and said mailing piece an impression roller for heating said discrete address of said strip and for placing pressure thereon, a pair of vacuum rollers flanking said impression roller adapted to move said strip with respect to said impression roller step by step, vacuum means for holding said strip stationary while said pin roller feeds a length of strip between said holding means and one of said vacuum rollers, said vacuum rollers being operable to advance said strip when said holding means is inoperable, and being inoperable when said holding means is operable.

No references cited.

WILLIAM B. PENN, *Primary Examiner.*